US008520855B1

(12) United States Patent
Kohno et al.

(10) Patent No.: US 8,520,855 B1
(45) Date of Patent: Aug. 27, 2013

(54) ENCAPSULATION AND DECAPSULATION FOR DATA DISINTEGRATION

(75) Inventors: Tadayoshi Kohno, Seattle, WA (US);
Roxana Geambasu, Seattle, WA (US);
Henry M. Levy, Seattle, WA (US)

(73) Assignee: University of Washington, Seattle, WA (US)

( * ) Notice: Subject to any disclaimer, the term of this patent is extended or adjusted under 35 U.S.C. 154(b) by 395 days.

(21) Appl. No.: 12/718,885

(22) Filed: Mar. 5, 2010

Related U.S. Application Data

(60) Provisional application No. 61/311,026, filed on Mar. 5, 2010, provisional application No. 61/209,276, filed on Mar. 5, 2009.

(51) Int. Cl.
*G06F 21/00* (2006.01)

(52) U.S. Cl.
USPC ............... 380/277; 726/8; 726/10; 713/171; 713/193; 380/259; 380/269; 455/424; 705/65

(58) Field of Classification Search
USPC .................. 380/259, 277; 713/171
See application file for complete search history.

(56) References Cited

U.S. PATENT DOCUMENTS

| | | | | |
|---|---|---|---|---|
| 5,764,767 A * | 6/1998 | Beimel et al. | | 713/180 |
| 6,956,950 B2 * | 10/2005 | Kausik | | 380/277 |
| 7,865,741 B1 * | 1/2011 | Wood et al. | | 713/193 |
| 8,184,953 B1 * | 5/2012 | Covell et al. | | 386/248 |
| 2001/0001876 A1 * | 5/2001 | Morgan et al. | | 713/171 |
| 2001/0050990 A1 * | 12/2001 | Sudia | | 380/286 |
| 2003/0115251 A1 * | 6/2003 | Fredrickson et al. | | 709/201 |
| 2003/0147535 A1 * | 8/2003 | Nadooshan et al. | | 380/277 |
| 2003/0147536 A1 * | 8/2003 | Andivahis et al. | | 380/277 |
| 2006/0269063 A1 * | 11/2006 | Hauge et al. | | 380/262 |
| 2007/0014406 A1 * | 1/2007 | Scheidt et al. | | 380/258 |
| 2007/0044143 A1 * | 2/2007 | Zhu et al. | | 726/8 |
| 2008/0130890 A1 * | 6/2008 | Rigler | | 380/259 |
| 2009/0116649 A1 * | 5/2009 | Perlman | | 380/277 |
| 2009/0190760 A1 * | 7/2009 | Bojinov et al. | | 380/269 |
| 2009/0323970 A1 * | 12/2009 | Cerruti et al. | | 380/281 |
| 2010/0054481 A1 * | 3/2010 | Jajodia et al. | | 380/284 |
| 2010/0185863 A1 * | 7/2010 | Rabin et al. | | 713/171 |

OTHER PUBLICATIONS

Alexander, C. et al., "Improved User Authentication in Off-the-Record Messaging," WPES, 2007.
"Announcement: Amazon EC2 Public IP Ranges," Amazon.com, 2010 [Online] Retrieved from the Internet<URL:http://developer.amazonwebservices.com/connect/ann.jspa?annID>.

(Continued)

*Primary Examiner* — Morshed Mehedi
(74) *Attorney, Agent, or Firm* — Fenwick & West LLP

(57) ABSTRACT

A configuration for encapsulating data that is unreadable after a predetermined timeout. To encapsulate data a random data key is generated and split into shares. A threshold number of shares are needed to reconstruct the key. The shares are stored at random locations within one or more networks. Each location is configured to delete the stored data after a predetermined time period. Encapsulated data is created by creating a vanishing data object (VDO) comprising the encrypted data, and data sufficient to locate at least a threshold number of key shares from their stored locations. The VDO becomes inaccessible after enough shares of the data are deleted such that the data key cannot be restored. However, if prior to timeout a sufficient number of data key shares are located and retrieved the data key can be reconstructed. The reconstructed data key is then used to decrypt the original data.

18 Claims, 9 Drawing Sheets

(56) References Cited

OTHER PUBLICATIONS

"Apache Performance Tuning," Apache, 2009, [Online] Retrieved from the Internet<URL:httpd:apache.org/docs/2.0/misc/perf-tuning.html>.

Avizienis, A. et al., "On the Implementation of N Version Programming for Software Fault Tolerant During Program Execution," In Proc. of COMPSAC, 1977.

Aziz, A., "Ten Free Services to Send Self-Destructing Emails with Expire/Disappear Automatically After Specified Time Interval," 2007.

"US Mayor Charged in SMS Scandal," BBC News, 2008, [Online] Retrieved from the Internet<URL:http://news.bbc.co.uk/2/hi/americas/7311625.stm>.

Bellare, M. et al., "Protecting Against Key Exposure: Strongly Key-Insulated Encryption with Optimal Threshold," Applicable Algebra in Engineering, Communication and Computing, 2006, vol. 16, No. 6.

Bellare, M. et al., "Forward Security in Private Key Cryptography," CT-RSA, 2003, Joye, M. (Ed.).

Boneh, D. et al., "A Revocable Backup System," USENIX Security, 1996.

Borisov, N., "Computational Puzzles as Sybil Defenses," Prc. of the Intl. Conference on Peer-to-Peer Computing, 2006.

Borisov, N. et al., "Off-the-Record Communication, or, Why Not to Use PGP," WPES, 2004.

Canetti, R. et al., "Exposure-Resilient Functions and All-or-Nothing Transforms," EUROCRYPT 2000, Preneel, B. (Ed.), 2000.

Canetti, R. et al, "A Forward-Secure Public-Key Encryption Scheme," EUROCRYPT 2003.

Castro, M. et al., "Secure Routing for Structured Peer-to-Peer Overlay Networks," Proc. of Symposium on Operating Systems Design and Implementation, 2002.

Danezis, G. et al., "Sybil-Resistant DHT Routing," ESORICS, 2005.

Dodis, Y. et al., "Intrusion-Resilient Public-Key Encryption," CT-RSA, 2003, LNCS 2612, M. Joyce (Ed.), pp. 19-32.

Dodis, Y. et al., "A Generic Construction for Intrusion-Resilient Public-Key Encryption," CT-RSA, 2004, Okamoto, T. (Ed.).

Dodis, Y. et al., "Key-Insulated Public Key Cryptosystems," EUROCRYPT 2002.

Dodis, Y. et al., "On Perfect and Adaptive Security in Exposure-Resilient Cryptography," EUROCRYPT 2001, vol. 2045.

Dodis, Y. et al., "Exposure-Resilience for Free: The Case of Hierarchical ID-Based Encryption," IEEE International Security in Storage Workshop, 2002.

Douceur, J.R., "The Sybil Attack," Proc. of IPTOPS, 2002.

"Email Being Used More in Divorce Cases," WebProNews, 2008, [Online] Retrieved from the Internet<URL:http://www.webpronews.com/topnews.2008/01/11/email-being-used-more-in-d%ivorce-cases>.

Falkner, J. et al., "Profiling a Million User DHT," Proc. of IMC, 2007.

Freedman, M.J. et al., "Tarzan: A Peer-to-Peer Anonymizing Network Layer," Proc. ACM CCS, 2002.

Geambasu, R. et al., "Vanish: Increasing Data Privacy with Self-Destructing Data," Proc. of Usenix Security, 2009.

"Google Defends Against Large-Scale Chinese Attacks," Google, 2010, [Online] Retrieved from the Internet<URL:http://www.techcrunch.com/2010/01/12/google-china-attacks/>.

Juang, J.K., "Practical Implementation and Analysis of Hyper-Encryption," Master's Thesis, 2009.

Knight, J.C. et al., "An Experimental Evaluation of the Assumption of Independence in Multiversion Programming," Jan. 1986, pp. 96-109, vol. 12, No. 1.

Lesniewski-Lass, C. et al., "Whanaungatanga: Sybil-Proof Distributed Hash Table," USENIX Symposium on Networked Systems Design and Implementation, 2010.

Maniatis, P. et al., "Impeding Attrition Attacks in P2P Systems," Proc. of ACM SIGOPS European Workshop, 2004.

Nair, S.K. et al., "A Hybrid PKI-IBC Based Ephemerizer System," International Information Security Conference, 2007.

"Jan. 2010 Web Server Survey," Netcraft Ltd, 2010, 2 pages, [Online] [Retrieved from the Internet on Jan. 4, 2011].

Neumann, P.G., "Security Criteria for Electronic Voting," National Computer Security Conference, 1993.

"Palin's Yahoo Account Hacked," washingtonpost.com, 2008, [Online] Retrieved from the Internet<URL:http://voices.washingtonpost.com/the-trail/2008/09/17/palins_yahoo_acco%unt_hacked.html>.

Perlman, R. "The Ephemerizer: Making Data Disappear," Journal of Information System Security, 2005, vol. 1, No. 1.

Rabin, M.O., "Provably Unbreakable Hyper-Encryption in the Limited Access Model," IEEE Information Theory Workshop on Theory and Practice in Information-Theoretic Security, 2005.

Shamir, A. "How to Share a Secret," Commun. ACM, 1979, pp. 612-613, vol. 22, No. 11.

Singel, R., "Encrypted E-mail Company Hushmail Spills to Feds," 2007, [Online] Retrieved from the Internet<URL:http://blog.wired.com/27bstroke6/2007/11/encrypted-e-mai.html>.

Singh, A. et al., "Defending Against Eclipse Attacks on Overlay Networks," Proc. of ACM SIGOPS European Workshop, 2004.

Sit, E. et al., "Security Considerations for Peer-to-Peer Distributed Hash Tables," Proc. of IPTPS, 2002.

Srivatsa, M. et al., "Vulnerabilities and Security Threats in Structured Overlay Networks: A Quantitative Analysis," Proc. of Annual Computer Security Applications Conference, 2004.

Steiner, M. et al., "Where is My Peer? Evaluation of the Vivaldi Network Coordinate System in Azureus," Proc. of Networking, 2009.

Steiner, M. et al., "A Global View of KAD," Proc. of IMC, 2007.

Stutzbach, D. et al., "Understanding Churn in Peer-to-Peer Networks," Proc. of IMC, 2006.

Stutzbach, D. et al., "Large-Scale Monitoring of DHT Traffic," Proc. of IPTPS, 2009.

Tran, A. et al., "Hashing it Out in Public: Common Failure Modes of DHT-Based Anonymity Schemes," Proc. of WPES, 2009.

"U.S. National Counterintelligence Center. Annual report to Congress on Foreign Economic Collection and Industrial Espionage," 2008, [Online] Retrieved from the Internet<URL:http://fas.org/irp/ops/ci/docs/fecie_fy00.pdf>.

Wolchok, S. et al., "Defeating Vanish with Low-Cost Sybil Attacks Against Large DHT's," Proc. of NDSS, 2010.

Yu, H. et al., "SybilGuard: Defending Against Sybil Attacks Via Social Networks," ACM SIGCOMM, 2006.

\* cited by examiner (a) Availability in Vuze-based Vanish.

(b) Vanish performance breakdown.

| N | Time (seconds) | | |
|---|---|---|---|
| | Encapsulate VDO | | Decapsulate VDO |
| | Without prepush | With prepush | |
| 10 | 6.3 | 0.056 | 0.326 |
| 20 | 6.5 | 0.056 | 0.449 |
| 50 | 25.6 | 0.056 | 3.32 |
| 100 | 48.1 | 0.056 | 14.7 |
| 150 | 70.9 | 0.056 | 41.2 |
| 200 | 94 | 0.056 | 89.5 |

(c) VDO operation execution times.

ENCAPSULATION AND DECAPSULATION FOR DATA DISINTEGRATION

CROSS REFERENCE TO RELATED APPLICATIONS

This application claims the benefit of U.S. Provisional Application No. 61/209,276, filed Mar. 5, 2009 and U.S. Provisional Application No. 61/311,026, filed Mar. 5, 2010 which are both incorporated by reference in their entirety.

FEDERALLY SPONSORED RESEARCH/DEVELOPMENT

This invention was made with government support under grant numbers CNS-0614975, CNS-0430477 and CNS-0846065 awarded by National Science Foundation. The government has certain rights in the invention.

BACKGROUND

1. Field of Art

The disclosure generally relates to the field of secured document access.

2. Description of the Related Art

The use of digital data to store and share private or sensitive information has become commonplace. Private or sensitive digital data may be stored locally on a personal computing device or it may be stored remotely by a server that caches, copies and archives information transmitted using web services. Additionally, the intended recipients may also store such information locally or remotely. The unwanted disclosure of private digital data has also become commonplace. Information can be disclosed by a trusted or intended recipient of the information or as a result of an accidental or malicious attack and theft.

One attempt to protect sensitive data stored either locally or remotely, requires explicitly and manually deleting all such data or to execute a command (e.g., install a cron job in UNIX) to perform the task. However, this approach is not very effective because one may not be able to delete data from all sources; for example, emails can be stored, cached, or backed up at numerous places throughout the Internet or on email servers. Furthermore, such techniques do not protect against physical theft of drives or storage devices prior to a manual delete, thus disclosure of sensitive data is still possible.

In another approach to protect sensitive data, the use of a standard public key or symmetric encryption scheme, such as PGP (pretty good privacy) and GPG (GNU privacy guard) have been employed. However, such protection measures only provide protection against attackers who do not have access to the decryption keys. For example, there exists situations where unauthorized parties could learn private keys, thus disclosure of sensitive data is still possible.

A potential alternative to standard encryption might be to use forward-secure encryption. Forward-privacy means that if an attacker learns the state of the user's cryptographic keys at some point in time, they should not be able to decrypt data encrypted at an earlier time. However, due to caching in backup archives, the attacker may either view past cryptographic state or force a user to decrypt his data, thereby violating the model for forward-secure encryption. For similar reasons, and to avoid introducing new trusted agents or secure hardware, other cryptographic approaches, like key-insulated and intrusion-resilient cryptography are not used. Finally, while exposure-resilient cryptography allows an attacker to view parts of a key, an attacker may view all of a key.

Another approach might be to use steganography, deniable encryption, or a deniable file system. The idea is that one could hide, deny the contents of, or deny the existence of private historical data, rather than destroying it. These approaches are also attractive but hard to scale and automate for many applications, such as generating plausible cover texts for emails and SMS messages. In addition, this system, if applied to local files in a particular folder, would require the user to take several steps. Its not an automatic or an invisible solution from a user's perspective For online, interactive communications systems, an ephemeral key exchange process can protect derived symmetric keys from future disclosures of asymmetric private keys. A system like OTR (off the record) messaging is particularly attractive, but this approach is not directly suited for less-interactive email applications, and similar arguments can be made for OTR's unsuitability for the other above-mentioned applications as well.

Another approach is the Ephemerizer family of solutions. These approaches involve the introduction of one or more (possibly thresholded) trusted third parties which (informally) escrow information necessary to access the protected contents. These third parties destroy this extra data after a specified timeout. The biggest risks with such centralized solutions are that they may either not be trustworthy, or that even if they are trustworthy, users may still not trust them, hence limiting their adoption. Indeed, many users may be wary to use dedicated, centralized trusted third party services after it was revealed that the Hushmail email encryption service was offering the clear-text contents of encrypted messages to a third party.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
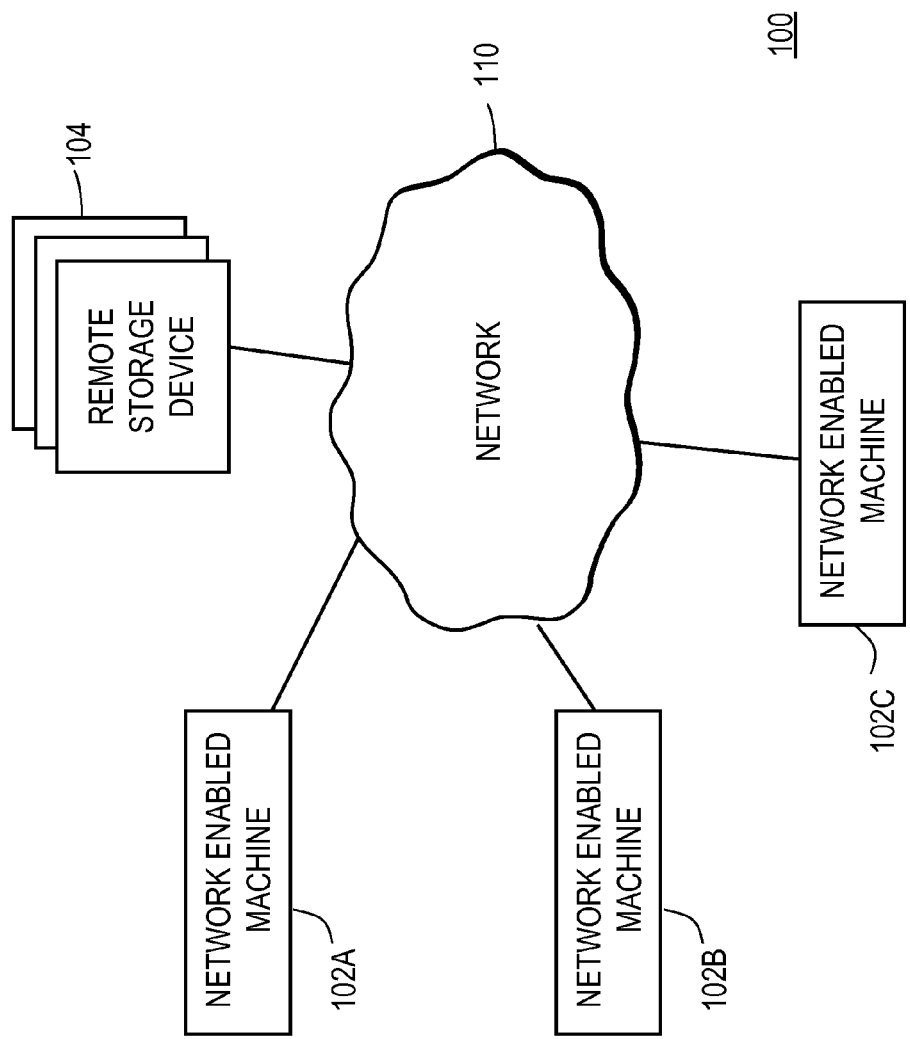
FIG. 1 is a high-level block diagram of a computing environment according to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Embodiments of the disclosed system, method and computer readable storage medium seek to protect the privacy of past, archived data such as a file or a message by encapsulating it and thereby preventing its contents from persisting indefinitely and becoming a source of retroactive information leakage. Regardless of whether the encapsulated data is copied, transmitted, or stored in the Internet, it becomes unreadable after a predefined period of time even if an attacker retroactively obtains both a pristine copy of the encapsulated data from before its expiration, and all of the user's past persistent cryptographic keys and passwords.

Disclosure is prevented by encapsulating the data such that the data is encrypted using a randomly generated encryption key. A data key is generated from the corresponding decryption key; the data key is then split into a predetermined number of pieces or shares, N (N comprising an integer value). However, only a predetermined threshold number, M (M comprising an integer value), of shares are required to reconstruct the data key, such that the threshold number, M, is less than or equal to N, ($M \leq N$). The shares of the data key are stored in one or more locations within a network. A location may be a node on a network or a virtual address within a node on a network. The node may include one or more devices within it (e.g., server systems or peer computer network). In another embodiment, the shares of the data key are stored in one or more locations of one or more networks selected from a set of networks. It is noted that a network includes a distributed, peer to peer network and a server-client network, wherein, as stated above, a network may comprise of one machine. A vanishing data object (VDO) is created comprising at least sufficient information to locate a threshold number, M of shares. Additionally, each location or node that stores a portion of the key is configured to delete the stored data after a specified period of time.

In one embodiment, a decryption configuration includes obtaining the vanishing data object and extracting sufficient information from the VDO to locate data key shares. The data key shares are retrieved from the remote storage locations. Only if the number of key shares retrieved is at least as much as the threshold number, M, then the data key is reconstructed and used to decrypt the encrypted data. However, if the number of key shares retrieved is less than the threshold number, M, then the data key is unrecoverable from the vanishing data object.

System Architecture

FIG. (FIG. 1 is a high-level block diagram of a computing environment 100 according to one embodiment. It is noted that for ease of discussion, in most instances FIG. 1 and the other figures use like reference numerals to identify like elements. A letter after a reference numeral, such as "102A," indicates that the text refers specifically to the element having that particular reference numeral. A reference numeral in the text without a following letter, such as "102," refers to any or all of the elements in the figures bearing that reference numeral (e.g. "102" in the text refers to reference numerals "102A" and/or "102B" in the figures).

FIG. 1 illustrates network enabled machines (or devices) 102A-C (generally 102) connected by a network 110 to a plurality of remote storage devices 104. It is noted that each machine (or grouping of machines at a particular location) on the network may be a node. At a high level, appropriately marked data is encrypted using a randomly generated encryption key. A data key is generated from the corresponding decryption key and shares (or portions, or parts, or pieces) of the data key are stored over the network 110 in one or more remote storage devices 104. During the decryption process the shares of the data key are retrieved over the network 110 from the remote storage devices 104. The recovered data key is used to decrypt and recover the encrypted data.

In one embodiment, data on a network enabled machine 102 is encrypted and encapsulated in a vanishing data object (VDO). The VDO is a data object that includes an encrypted message and information on where one or more shares of a key are located as further described below. The one or more shares of the keys will be retrieved and used to decrypt the message as further described below. As is further described herein, the data object "disappears" after a predetermined time period.

In one embodiment, the VDO is transmitted over the network 110 to at least another network enabled machine 102 which retrieves the data key shares from the appropriate remote storage devices 104 to decrypt the data. In another embodiment, the data on a network enabled machine 102 is encrypted and encapsulated in a VDO which is stored locally; subsequently the locally stored VDO is used to retrieve data key shares over the network 110 from remote storage devices 104 to decrypt data prior to the timeout. In another embodiment, the data on a network enabled machine 102 is encrypted and encapsulated in a VDO which is remotely stored and accessed either locally or by another network enabled machine 102.

The network 110 represents the communication pathways between the network enabled machine 102 and the one or more remote storage devices 104. The network 110 can also utilize dedicated or private communications links that are not necessarily part of the Internet. In one embodiment, the network 110 uses standard communications technologies and/or protocols. Thus, the network 110 can include links using technologies such as Ethernet, Wi-Fi (802.11), integrated services digital network (ISDN), digital subscriber line (DSL), asynchronous transfer mode (ATM), etc. Similarly, the networking protocols used on the network 110 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. In one embodiment, at least some of the links use mobile networking technologies, including general packet radio service (GPRS), enhanced data GSM environment (EDGE), code division multiple access 2000 (CDMA 2000), and/or wide-band CDMA (WCDMA). The data exchanged over the network 110 can be represented using technologies and/or formats including the hypertext markup language (HTML), the extensible markup language (XML), the wireless access protocol (WAP), the short message service (SMS) etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Example Computing Machine Architecture

Figure 2:
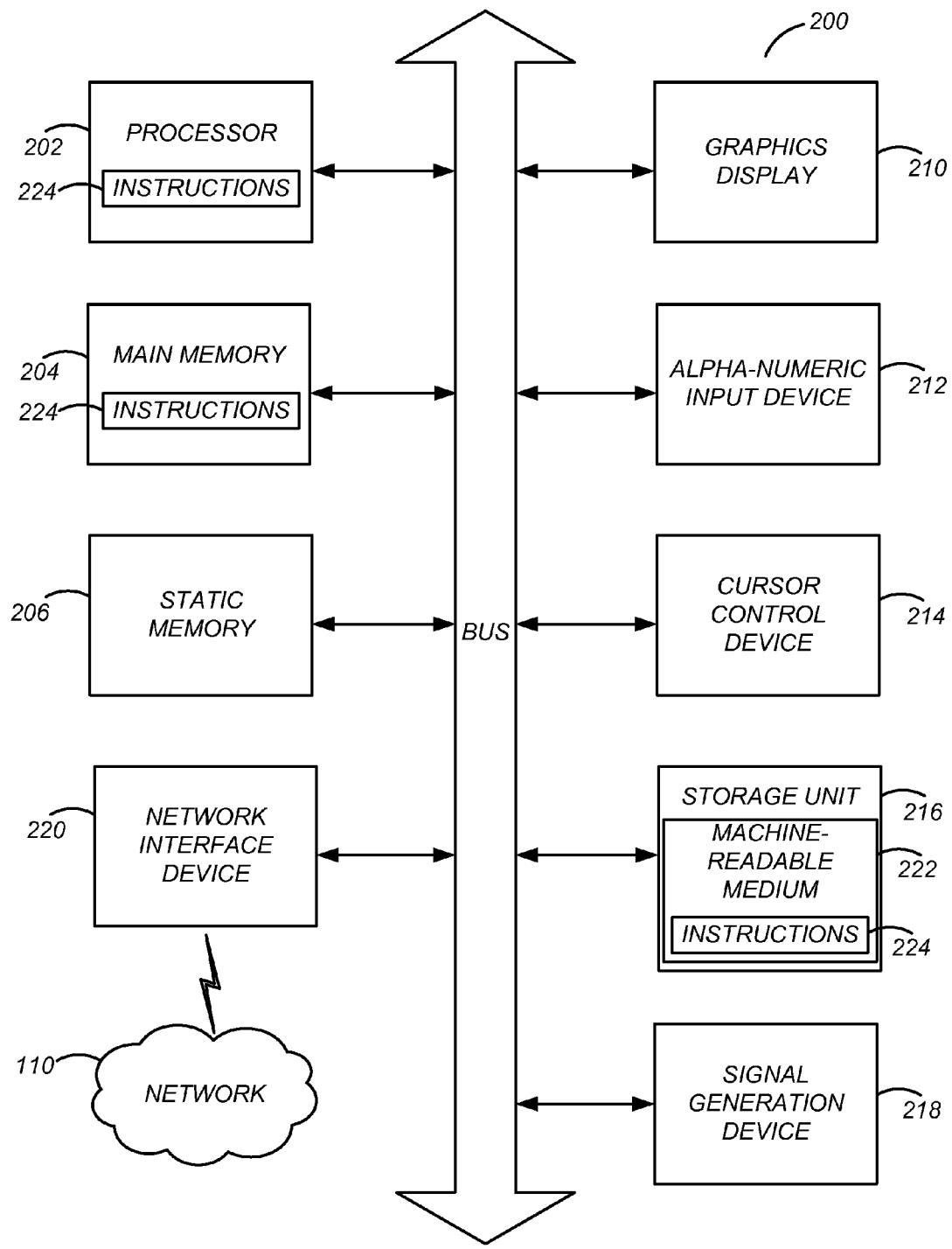
FIG. 2 is a high-level block diagram illustrating a functional view of a typical computer system for use as one of the entities illustrated in the environment of FIG. 1 according to one embodiment.

FIG. 2 is a high-level block diagram illustrating one embodiment of a typical computing machine 200 for use as one of the entities illustrated in the environment 100. It is noted that the computing machine 200 may also be a system or part of a system, e.g., two or more machines operating together or one or more machines operating with one or more other devices.

FIG. 2 illustrates components of an example machine able to read instructions from a machine-readable medium and execute them in one or more processors and/or controllers. Specifically, FIG. 2 shows a diagrammatic representation of a machine in the example form of a computer system 200 within which instructions 224 (e.g., software code) for causing the machine (e.g., having the one or more processors and/or controllers) to perform anyone or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 224 (sequential or otherwise) that specify actions to be taken by that machine. Further, while only a single machine is illustrated, the term "machine" shall also be taken to include any collection of machines that individually or jointly execute instructions 224 to perform anyone or more of the methodologies discussed herein.

The example computer machine 200 includes a processor 202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 204, and a static memory 206, which are configured to communicate with each other via a bus 108. The computer system 200 may further include graphics display unit 210 (e.g., a plasma display panel (PDP), a liquid crystal display (LCD), a projector, or a cathode ray tube (CRT)). The computer system 200 may also include alphanumeric input device 212 (e.g., a keyboard), a cursor control device 214 (e.g., a mouse, a trackball, a joystick, a motion sensor, or other pointing instrument), a storage unit 216, a signal generation device 218 (e.g., a speaker), and a network interface device 220, which also are configured to communicate via the bus 208.

The storage unit 216 includes a machine-readable medium 222 on which is stored instructions 224 (e.g., software) embodying any one or more of the methodologies or functions described herein. The instructions 224 (e.g., software) may also reside, completely or at least partially, within the main memory 204 or within the processor 202 (e.g., within a processor's cache memory) during execution thereof by the computer system 200, the main memory 204 and the processor 202 also constituting machine-readable media. The instructions 224 (e.g., software) may be transmitted or received over the network 110 via the network interface device 220.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and that cause the machine to perform any one or more of the methodologies disclosed herein. The term "machine-readable medium" includes, but not be limited to, data repositories in the form of solid-state memories, optical media, and magnetic media.

Configuration for Encapsulating Data

Figure 3:
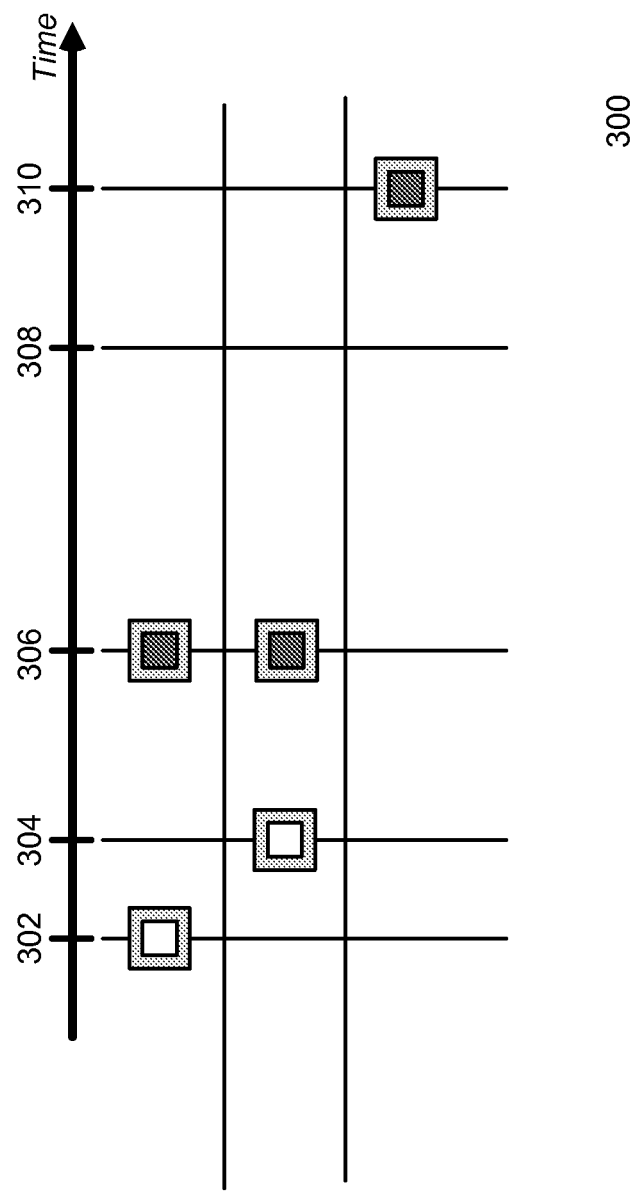
FIG. 3 illustrates one embodiment of a use-case scenario for encapsulating and decapsulating data.

Referring now to FIG. 3, it illustrates an exemplary timeline 300 as it pertains to the embodiments disclosed herein. To support the notion of self-destructing data, such as emails, text messages, trash bins, etc., a notion of a vanishing data object (VDO) is introduced. A VDO encapsulates the user's data, such as a file or a message and prevents its contents from persisting indefinitely and becoming a source of retroactive information leakage. Regardless of whether the VDO is copied, transmitted or stored over the network 110, it becomes unreadable even if an attacker retroactively obtains a pristine copy of the VDO from before its expiration and all of the associated persistent cryptographic keys and passwords. In one embodiment, a VDO is created at a first time 302. At a second time, 304, an intermediary service archives a pristine copy of the VDO. The VDO becomes unreadable at a third time 306, which is also referred to as the timeout. A timeout occurs after predetermined period of time when storage locations delete a certain number of pieces or shares of the decryption key used decrypt the data. For example, as further described below, when more than N minus M (N−M) shares become unavailable, the VDO becomes unreadable. At a fourth time 308, attacker decides to attack or access the VDO. At a fifth time 310, the attacker obtains a pristine copy of the VDO from an intermediary service or from the user. However, an attacker, or even an intended recipient will not be able to access the pristine VDO after the time out because of the embodiments illustrated below.

Figure 4:
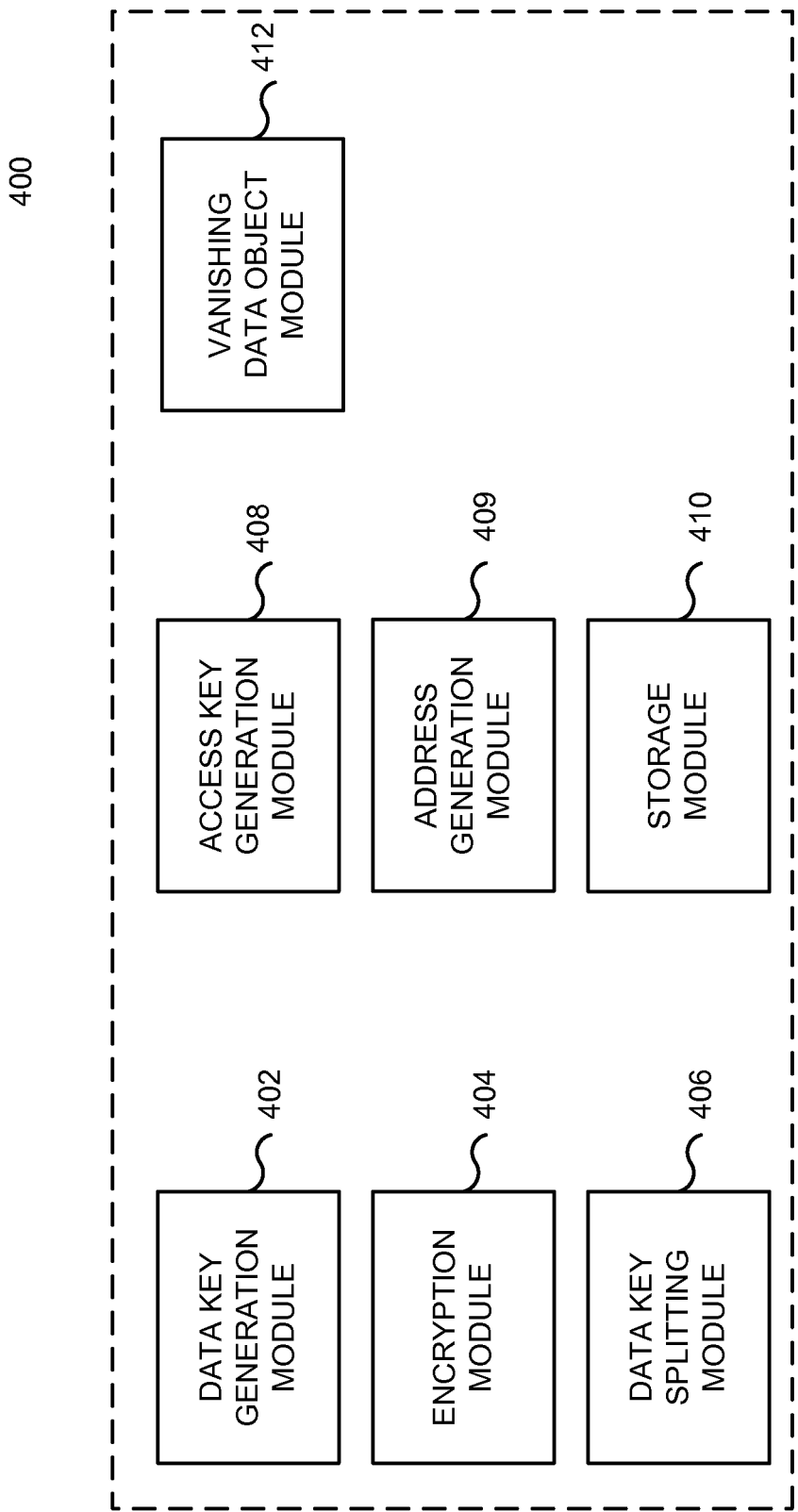
FIG. 4 illustrates a high-level block diagram of an encapsulating module according to one embodiment.

Turning now to FIG. 4, it illustrates a VDO generation system. The VDO generation system is illustrated as a high-level block diagram of modules configured to encapsulate digital data into a VDO according to one embodiment. Upon reviewing the descriptions herein, those of skill in the art will recognize that other embodiments can have different and/or other modules than the ones described here, and that the functionalities can be distributed among the modules in a different manner. The VDO generation system includes an encapsulating module 400, a key generation module 402, an encryption module 404, a data key splitting module 406, an access key generation module 408, an address generation module 409, a storage module 410, and a VDO generation module 412. The modules are configured to function and interoperate as described herein.

The encapsulating module 400 includes the data key generation module 402 which generates one or more random data keys. In an embodiment which uses symmetric key cryptography, the key generation module 402 generates a random key, herein called the data key to encrypt digital data. In one embodiment data key generation module 402 randomly generates keys using a random number generator. In one embodiment data key generation module 402 is a pseudorandom number generator which despite being a computer algorithm, produces data which appears random under analysis. In an embodiment which uses asymmetric key cryptography, the key generation module 402 generates a mathematically related key pair comprising: a public encryption key and a private decryption key such that messages encrypted with the public key can only be decrypted with the corresponding private key. The private decryption key is hereinafter also referred to as the data key. The key generation module 402 generates the public and private key pair using a random number generator or a pseudorandom generator and an asymmetric key algorithm. The data key generation module 402 produces random data keys which are bits.

The encryption module 404 uses an algorithm to convert data into encrypted data, making it unreadable to anyone except those possessing the data key. In one embodiment, the encryption module 404 uses a symmetric encryption key such as Data Encryption Standard (DES) or Advanced Encryption Standard (AES) to convert data into encrypted data. In another embodiment, the encryption module 404 uses a public key encryption application such as PGP to convert data into encrypted data.

The data key splitting module 406 splits the data key into one or more pieces, called shares (or parts or portions or pieces). In one embodiment, the data key splitting module 406 splits the data key, K, into a predetermined number, N, of shares, $k_1, \ldots, k_N$. In another embodiment the data key splitting module 406 uses threshold secret sharing to split the data key into N pieces. It is noted that N comprises an integer value. In one embodiment, a threshold number, M, of shares determines how many of the N shares are needed to reconstruct the original data key. It is also noted that $M \leq N$. For example, if the key is split into N=20 shares and the threshold, M, is ten keys, then the key can be computed given any ten of the twenty shares. The threshold ratio is the percentage of the N keys needed. In the above example, the threshold ratio is 50%. It is noted that a ratio of less than 100% is used in one embodiment, so that the loss of a single share would not cause the loss of the entire data key. In another embodiment, a threshold ratio of 100% is used, wherein the loss of a single share will cause the loss of the entire data key.

In one embodiment, the address generation module 409 identifies one or more locations to store each share of the data key within a network. In one embodiment, a location is a node within a network. In another embodiment, a location is a virtual address within a node on a network. In one embodiment, the address generation module 409 identifies each location by deriving an address of each location using a random or pseudorandom number generator. It is noted that the network can be a distributed, peer to peer network or a server-client network. For example, in one embodiment the address generation module 409 randomly derives indices in a distributed hash table (DHT). In another embodiment, the access key generation module 408 generates an access key using a random or pseudorandom number generator. Subsequently, the address generation module 409 uses a cryptographically secure pseudorandom number generator keyed to the random access key to derive N indices into a DHT, $I_1, \ldots, I_N$. In another embodiment, the address generation module 409 selects one or more servers from a set of servers wherein each server is selected randomly or deterministically.

The storage module 410 transmits and stores the data key shares at the identified location and sets a timeout for each share. Thus, in one embodiment the storage module 410 stores the N shares, $K_1, \ldots, K_N$ at the derived pseudorandom locations throughout the DHT; specifically, for each $I \in \{1, \ldots, N\}$, the storage module 410 stores the share $K_i$ at index $I_i$ in the DHT. In another embodiment, the storage module stores the N shares at the identified set of servers.

In one embodiment, the storage module 410 of FIG. 4 sets a timeout for each key share. A timeout is a predetermined period of time after which a storage location will delete its stored data key share. For example, if the timeout is set for 8 hours, then the remote location (or machine) will be instructed to delete its stored data key share after 8 hours. In one embodiment, the storage module 410 configures the remote location to delete its stored data key share based on the node's clocking mechanism. In another embodiment, the storage module 410 includes the timeout information in a packet header of the data key shares. In one embodiment, if the DHT allows a variable timeout, the storage module 410 also sets the user-chosen or a different timeout for each share stored in the DHT.

The VDO module 412 creates the VDO data object. The VDO comprises at least the encrypted data and information sufficient to retrieve at least a threshold number, M, of shares. In one embodiment the VDO comprises the encrypted data, number N of shares, number M of shares and information sufficient to determine the locations of at least a threshold number, M, of shares. In another embodiment, the VDO comprises the server names of where at least a threshold number, M of shares are located. In another embodiment the VDO comprises the access key, the encrypted data, number N of shares of the data key and the threshold. In one embodiment, the VDO is stored as a single data object. In another embodiment, the VDO is stored as separate data objects wherein a part of the VDO is stored on one server, and another part is stored locally. It is noted that the VDO data object may be predefined as a data object structure and populated with the values generated by the particular modules of the VDO generation system.

Figure 5:
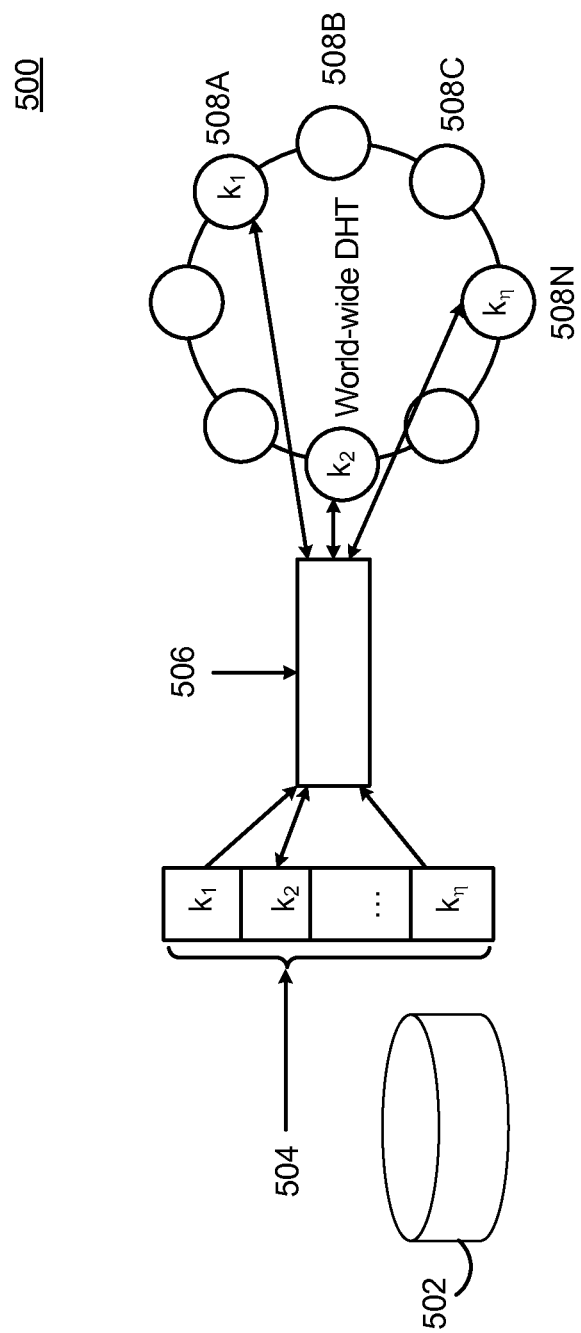
FIG. 5 illustrates one embodiment of a system architecture for encapsulating data.

FIG. 5 shows one embodiment of an architecture 500 for splitting and storing key shares. The architecture includes encrypted data 502 stored in a storage, one or more shares of the key 504, an index 506, and one or more pseudorandom nodes 508A-508N (N corresponding to a last pseudorandom node) (generally 508) of a DHT. In one embodiment, the encrypted data 502 which is created by taking data and encrypting it with a randomly generated encryption key. In another embodiment the encrypted data 502 is created by taking data and an explicit timeout and encrypting it with a randomly generated encryption key. It is noted that in the case of symmetric cryptography, the encryption key (K) is then split into a predetermined number, N, of shares 504 ($k_1$–$k_n$, n being the last share). However, in the case of asymmetric cryptography, the corresponding decryption key is split into a predetermined number, N, of shares 504 ($k_1$–$k_n$, n being the last share). A random access key (L) is determined and a pseudorandom number generator, keyed to (L) is used to create a number of indices 506 in a DHT equivalent to the predetermined number of shares, which in this example are N shares. Subsequently, each share of the data key ($k_1$–$k_n$) is stored at one or more pseudorandom nodes 508 throughout the DHT.

Figure 6:
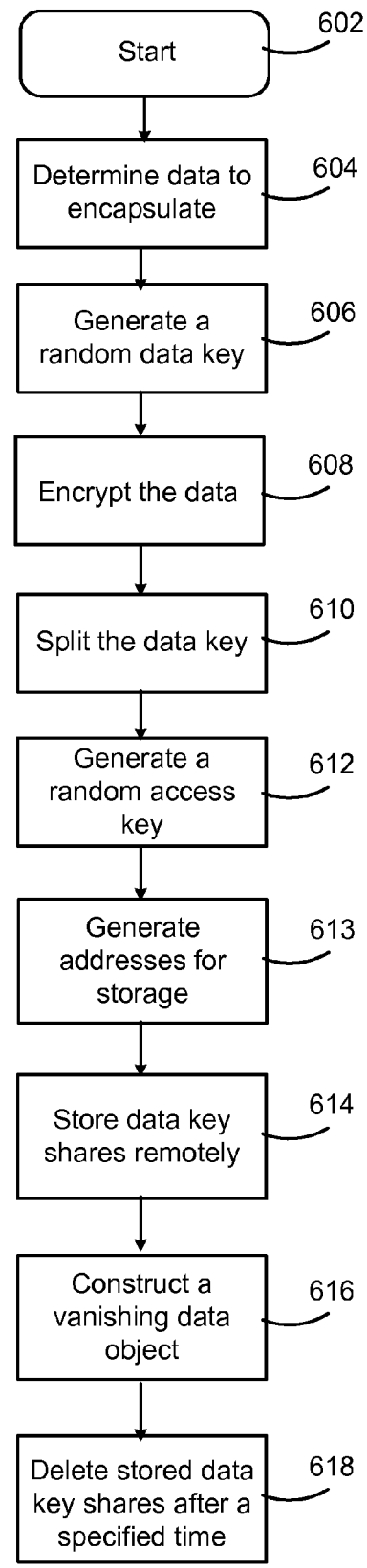
FIG. 6 illustrates one embodiment of a process for encapsulating data.

FIG. 6 illustrates one embodiment of a process for encapsulating data. Those of skill in the art will recognize that other embodiments can perform the steps of FIG. 6 in different orders. Moreover, other embodiments can include different and/or additional steps than the ones described here.

The process starts 602 and receives 604 data to encapsulate. In one embodiment, the data placed in a particular folder, such as the recycle bin, is automatically identified for encapsulation. In another embodiment, specific instructions may be required to identify data for encapsulation. For example, a particular file, email message, text message or a highlighted portion thereof can be identified for encapsulation.

The process generates 606 a random data key and encrypts 608 the data using the generated data key. The process splits (or divides or breaks) 610 the data key in a predetermined number, N, of shares. As noted previously, N typically is an integer value. As noted above, a share of a data key is a portion (or part or piece) of the entire data key. In one embodiment the data key is split 610 using threshold secret sharing. A parameter of the secret sharing is a threshold that can be set by the user or by an application. The threshold determines how many of the N shares are needed to reconstruct the original key. A threshold ratio is the percentage of the N keys needed to reconstruct the data key.

In one embodiment, once the data key is split 610 in a predetermined number of shares, the process generates random locations to store each data key share at a location within a network. It is noted that a network can be a distributed, peer to peer network or a server-client network. In another embodiment, the process generates 612 a random access key to derive locations to store the data key shares. For example, the process uses a cryptographically secure pseudorandom number generator keyed to the random access key to generate 613 a number of addresses in a DHT equivalent to the predetermined number of shares. The process stores 614 the data key shares at the locations identified by the generated addresses.

The process constructs (or creates or generates) 616 a vanishing data object (VDO) comprising at least information sufficient to retrieve a threshold number, M, of shares. In one embodiment, the VDO contains locations of each of the data key shares. In another embodiment, the VDO comprises at least the access key, the encrypted data, the number, N, of shares and the threshold number, M, of shares required to reconstruct the key. In one embodiment, the VDO is sent to over one or more networks to one or more recipients in the form of an email, text message or other forms of communication. In another embodiment, the VDO remains stored locally in one or more predetermined folder such as the recycle bin.

In one embodiment, the process provides instructions 618 for the storage locations to delete the stored key shares after a specified period of time. In one embodiment the instructions are contained in metadata associated with the received shares. For example, the timeouts can be stored at the beginning, at the middle or at the end of the data key shares sent to a node. Additionally, each share could be split across multiple objects. In other embodiments, instructions may be provided to a server to delete data key shares after a specified period of time. In yet another embodiment, the process can be configured to rely upon a time out period within each particular node. In such embodiments, each node includes a time-out parameter that is set to a predetermined time value. If no action is taken on received data after that predetermined time period, the data is deleted from within that node.

The configurations described provide several advantages and benefits to encapsulating data as is disclosed. For example, the configurations provide highly enhanced data security. Once a predetermined number of data keys are lost or deleted, the VDO becomes inaccessible and the underlying data cannot be accessed. After a time out, even if an attacker can obtain the VDO locally or from some archived location on the internet, the underlying document cannot be accessed. In the embodiments described above, an attacker cannot retrieve underlying data even if an attacker can retroactively obtain a pristine copy of that data and any relevant persistent cryptographic keys and passphrases from before the timeout. Even if the intended recipient of the VDO wanted to access and disclose the underlying data, the underlying data would be inaccessible after the predetermined timeout. In addition to rendering the underlying data inaccessible after the timeout, the embodiments of encapsulation achieve additional benefits, such as: it does not require any explicit delete action by the user or the parties storing the data; there is no need to modify stored or archived copies of that data; the results are achieved without the use of secure hardware; without relying on the introduction of any external services that would be deployed and without introducing new privacy risks to the users.

Decapsulating Vanishing Data Object

The configurations for encapsulating the data in a secure manner have an equally beneficial and advantageous process for decapsulating the data that further provides enhanced security of the data. The decapsulation configuration is operational at a storage location that is configured to receive the encapsulated data and must decapsulate it in order to access the data contents within it. The storage location can be local node (e.g., the same node that created the VDO) or can be a remote node.

Figure 7:
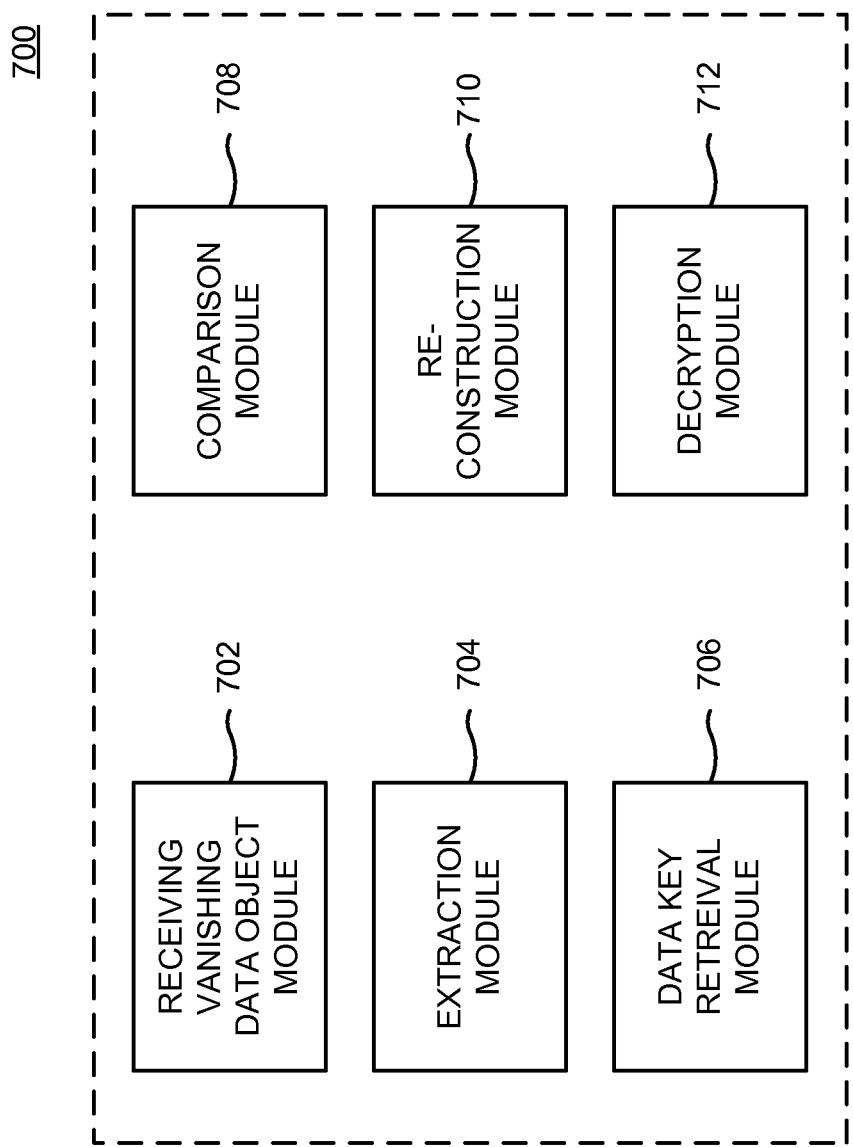
FIG. 7 illustrates a one embodiment of a high-level block diagram of a decapsulating module.

FIG. 7 illustrates one embodiment of a decapsulating module 700. Those of skill in the art will recognize that other embodiments can have different and/or other modules than the ones described here, and that the functionalities can be distributed among the modules in a different manner. The decapsulating module includes a receiving vanishing data object (receiving VDO) module 702, an extraction module 704, a data key retrieval module 706, a comparison module 708, a re-construction module 710, and a decryption module 712. The modules may be embodied as instructions (e.g., 214, program code) executable by the processor 202 described previously. The functional structure and operation of the modules is further described below.

The VDO receiving module 702 which identifies a received VDO. In one embodiment the VDO comprises, at least information sufficient to retrieve a threshold number, M, of shares and the encrypted data. In another embodiment, the VDO comprises the encrypted data, number N of shares, number M of shares and the locations of at least a threshold number, M, of shares. In another embodiment, the VDO comprises the server names of where at least a threshold number, M of shares are located. In one embodiment, the VDO comprises an access key, encrypted data, number, N, of shares and a threshold number, M of shares required to reconstruct the key. The extraction module 704 extracts the access key from the VDO. The data key retrieval module 706 derives the locations of the shares of the data key. In one embodiment, the locations of the key shares are stored explicitly the in the VDO. In another embodiment, the data retrieval module 706 derives the locations of data key shares by using the access key as a seed to the pseudorandom number generator to derive indices in the DHT.

Once the locations are identified, the data key retrieval module 706 retrieves the data key shares from those locations. The comparison module 708 determines if the data key shares retrieved is greater than or equal the threshold number, M of shares. In another embodiment, the comparison module 708 communicates with the data key retrieval module 706 to retrieve the needed number of shares as specified by the threshold number, M of shares. Thus the data key retrieval module 706 will conclude retrieving data key shares once the threshold number, M, of shares is reached. If the data key shares retrieved are equal to or greater than the threshold number, M of keys required, then the re-construction module 710 reconstructs the data key. The decryption module 712 uses the data key to decrypt the encrypted data and produce the original data.

Figure 8:
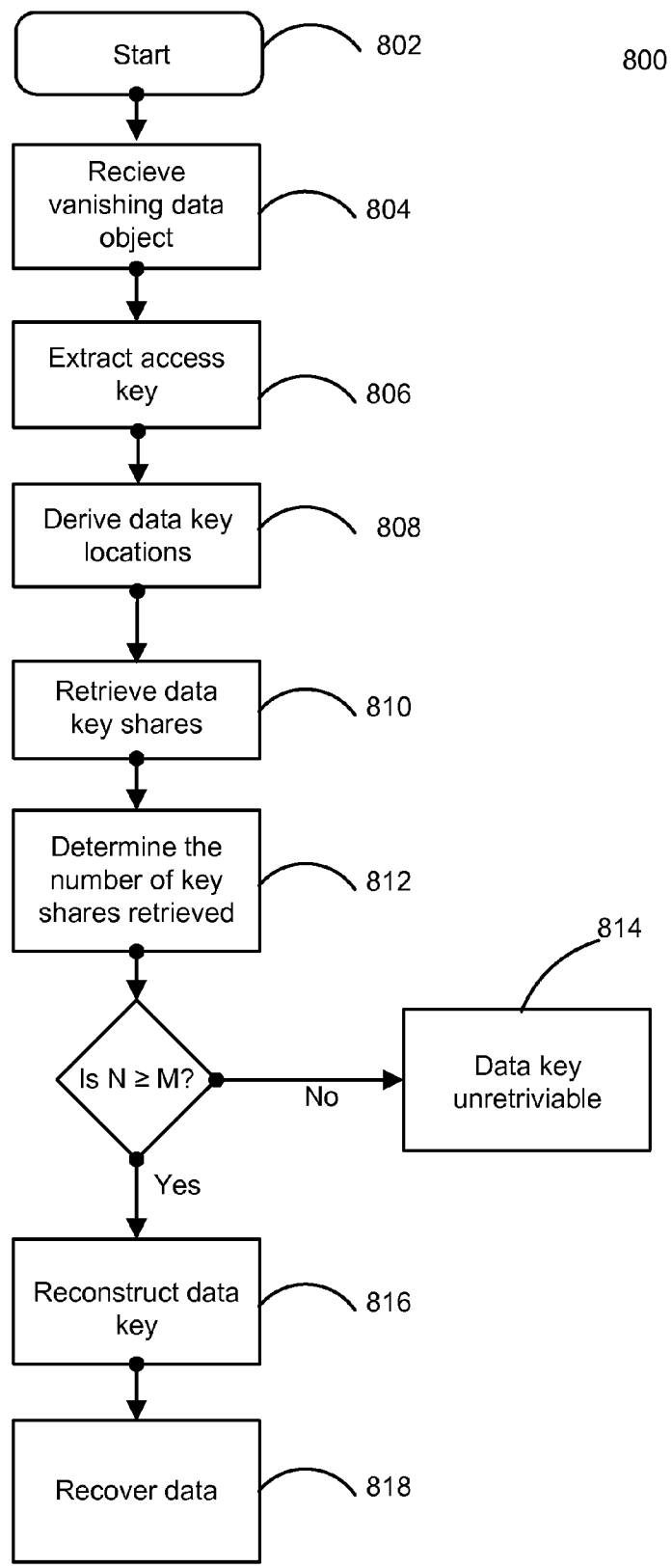
FIG. 8 illustrates one embodiment of a process for decapsulating data.

FIG. 8 illustrates one embodiment of a process for decapsulating a vanishing data object (VDO). The process starts 802 and identifies 804 VDO to decapsulate. In one embodiment, the VDO is stored locally in a pre-identified folder, such as the recycle bin. In one embodiment, the VDO may be transmitted over a network. For example, it may be embedded within an email message, text message or any part thereof.

In one embodiment, the process extracts the locations of the data key shares stored in the VDO. In another embodiment, the process extracts 806 an access key from the VDO to derive locations of the data key shares. The key share locations are derived 808 by performing a lookup in an DHT index keyed to the access key. The process then retrieves 810 key shares from one or more locations. In another embodiment, the process retrieves 810 the needed number of shares as specified by the threshold number, M, of shares. In one embodiment, the data key shares are stored in one or more locations within a distributed network architecture such as a peer to peer network. In another embodiment, the data key shares are stored in one or more locations within a server-client network architecture.

The process determines 812 the number of key shares retrieved. If the number of data key shares retrieved is less than 814 the threshold number, M, of shares, then the data key is irretrievable from the VDO. If however, the number of key shares retrieved is greater than 816 the threshold number M, of shares then the process reconstructs the data key.

The process uses the data key to decrypt and recover 818 the original data. Assuming the timeout has not occurred, the process will likely recover data key shares equal to or greater than the threshold number, M, of shares. Thus, it is likely to recover and decrypt data before the time out.

The decapsulation configuration beneficially provides additional enhanced security by ensuring that encrypted data is only decryptable with the retrieval of a predetermined number of key shares, M, within a predetermined time period. After that time period the message is no longer available with high probability. Thus, entities engaged in malfeasant activity are significantly hindered from engaging in damaging acts involving the message due to the need for reconstructing the key within a finite time period.

Cascading Feature

The configuration and process described can also be applied in a cascaded configuration, which further enhances security of the data. In particular, the configuration can be structured to include a cascading feature resembling a tree of arbitrary depth, where the data key is split into one or more shares at a first level and each share is further split in one or more sub-shares at a second level and each share at each level can be divided into additional shares at the next level, one or more times. For example, in the process described above, the data key, (K), is split at a first level into one or more data key shares ($k_1 \ldots k_n$). In addition, each share of the data key ($k_1$) is further split or divided at a second level into sub-shares (for example, $g_1 \ldots g_n$). The cascading configuration described below splits the data key at one or more levels such that each share at each level can be divided into additional shares at the next level one or more times.

It is noted each set of shares at each level can be stored in one or more network system. For example, each share at each level can be stored in one or more locations in a distributed peer to peer network storage system or in one or more servers within a server-client network.

An embodiment of the cascading configuration which splits the data key at two levels is described below. However, it is noted that in other embodiments, the data key can be split at two or more levels using the process described below. In one embodiment the data key splitting module 406 splits the data key at a first level, into N number of shares, ($k_1, k_2 \ldots, k_n$) such that a specified threshold of one or more shares are needed to reconstruct the data key. Then the data key splitting module 406 splits, for example, $k_1$ at a second level, into N' number of shares, ($g_{1'} \ldots g_{n'}$). In one embodiment, the data key splitting module 406 uses threshold secret sharing to split $k_1$ into N' number of shares such that a threshold, M' of shares are required to reconstruct $k_1$. It is noted that M' is $\leq$N'. For example, a random or a pseudorandom number generator is used to derive N' indices into a DHT. In another embodiment, the access key generation module 408 generates a random access key, L' and uses a cryptographically secure pseudorandom number generator keyed to the access key to derive N' indices into a DHT. The storage module 410 stores N' shares of $k_1$ at the derived pseudorandom locations throughout the DHT.

Similarly, the key splitting module 406 splits $k_2$ at a second level, into N" number of shares ($h_{1''} \ldots h_{n''}$). In one embodiment, the data key splitting module 406 uses threshold secret sharing to split $k_2$ into N" number of shares such that a threshold, M" of shares are required to reconstruct $k_2$. It is noted that M" is $\leq$N". In one embodiment, a random or a pseudorandom number generator is used to derive N" indices into a DHT. In another embodiment, the access key generation module 408 generates a random access key L" and uses a cryptographically secure pseudorandom number generator keyed to the access key L" to derive N" indices into another DHT. The storage module 410 stores N" shares of $k_2$ at the pseudorandom locations throughout the DHT.

As noted above, additional embodiments to split the data key K at one or more levels into one or more shares at each level can be achieved by using the configuration described herein.

The configurations for encapsulating the data in a cascaded manner have an equally beneficial and advantageous configuration for decapsulating the data that further provides enhanced security of the data. The decapsulation configuration is operational at a location that is configured to receive the encapsulated data and must decapsulate it in order to access the data contents within it. The location can be a local node (e.g., the same node that created the VDO) or can be a remote node.

In one embodiment, the decapsulation module 700 decapsulates a vanishing data object which has been encapsulated in a cascading manner. In one embodiment, the extraction module 704 extracts a threshold number M' and M" of shares to reconstruct $k_1$ and $k_2$ respectively. In another embodiment, the data key retrieval module 706 derives the locations of the shares of both sets of data key ($g_{1'} \ldots g_{n'}$ and $h_{1''} \ldots h_{n''}$). In one embodiment, the data key retrieval module 706 retrieves the data key shares from servers in a server-client network. In another embodiment, the data key retrieval module 706 retrieves the data key shares from the nodes of the corresponding DHT. In another embodiment, the data retrieval module 706 retrieves the data key shares from both a dedicate server in a server-client network and from the nodes of the corresponding DHT in a distributed network.

The comparison module 708 determines if the data key shares retrieved for both sets of data key ($g_{1'} \ldots g_{n'}$ and $h_{1''} \ldots h_{n''}$) at a third level are equal to or greater than the threshold number, M' and M" of shares, respectively. If the data key shares retrieved for ($g_{1'} \ldots g_{n'}$ and $h_{1''} \ldots h_{n''}$) are equal to or greater than the threshold number, M' and M" respectively, then the re-construction module 710 reconstructs $k_1$ and $k_2$ at a second level. The re-construction module 710 further reconstructs the data key, K, using $k_1$ and $k_2$ at a first level. The decryption module 712 uses the data keys to decrypt the encrypted data and produce the original data.

The process for encapsulating data in a cascaded configuration is described below. Although the process described below describes splitting the data key at two levels, it is noted that in other embodiments, the data key can be split at two or more levels using the same process. Referring to FIG. 6 the process splits 610 the data key in two or more shares at a first level: ($k_i$), ($k_2$) and so forth, such that each share is needed to reconstruct the data key. Furthermore, the process splits 610 each share of the data key, $k_1$ and $k_2$ at a second level into N' and N" number of shares, respectively. In one embodiment, the process splits 610 one or more share of the data key, $k_1$ and $k_2$ using threshold secret sharing such that a threshold number, M' and M" are respectively required to reconstruct $k_1$ and $k_2$. It noted that M' and M" are less than or equal to N' and N" respectively.

In one embodiment the process uses a random or pseudorandom number generator to generate 613 indices of addresses for each share of $k_1$ and $k_2$. In another embodiment, the process generates 612 a random access key L' and L" for both $k_1$ and $k_2$ respectively. Using a cryptographically secure pseudorandom number generator keyed to the random access key, the process generates 613 an index of addresses for each $k_1$ and $k_2$. It is noted that $k_1$ and $k_2$ can each be stored in different networks, including a distributed, peer to peer network or a server-client network. The process stores 614 the data key shares $k_1$ and $k_2$ in the pseudorandom locations of their respective networks.

As noted above, additional embodiments to split the data key at one or more levels into one or more shares at each level can be achieved by using the process described herein.

The process for encapsulating the data in a cascaded manner have an equally beneficial and advantageous process for decapsulating the data that further provides enhanced security of the data. The decapsulation process is operational at a location that is configured to receive the encapsulated data and must decapsulate it in order to access the data contents within it. The location can be a local node (e.g., the same node that created the VDO) or can be a remote node.

In one embodiment of the decapsulation process implementing a cascading feature, the process 806 extracts the locations of both sets of data key shares ($g_{1'}$ . . . $g_{n'}$ and $h_{1''}$ . . . $h_{n''}$) at the third level. In another embodiment access keys, L' and L" are used to derive locations of key shares at second level. In another embodiment, the access key L is used to derive locations of all the key shares at every level. The process then retrieves 810 key shares at the third level from one or more locations within each network used. The process determines 812 the number of key shares retrieved from each network. If at the third level, the number of data key shares retrieved from either sets of data key shares ($g_{1'}$ . . . $g_{n'}$ and $h_{1''}$ . . . $h_{n''}$) are less than 814, the respective threshold number, M' or M", of shares, and if both sets of shares ($g_{1'}$ . . . $g_{n'}$ and $h_{1''}$ . . . $h_{n''}$) are needed to reconstruct the data key, then the process cannot generate $k_1$ and $k_2$ nor the data key K, thus the data key is irretrievable from the VDO. If however, the number of key shares retrieved is greater than 816 the threshold number M' and M", for both sets of data key ($g_{1'}$ . . . $g_{n'}$ and $h_{1''}$ . . . $h_{n''}$) then the process reconstructs $k_1$ and $k_2$ at the second level. Using the process described above, the process reconstructs 816 the data key K at the first level if a threshold number M of key shares are retrieved. The process recovers 818 the data by decrypting the encrypted data.

Example Application of Configuration

By way of example, the configurations disclosed are described in an application setting. In one embodiment, (e.g., referenced as Vanish to correspond to how a VDO is created and retrieved or "vanish" as disclosed herein), integrates with two distributed networking systems called Vuze and OpenDHT. By leveraging existing, unmodified DHT deployments, the core functions of the embodiment are achieved, the resulting system supports a variety of applications, and the performance of VDO operations is dynamic and interesting.

To integrate Vanish with the Vuze DHT, a configuration includes: (1) a security measure to prevent lookup sniffing attacks and (2) optimizations to achieve desired performance for applications. All these changes are local to Vanish nodes and do not need adoption by other nodes in the Vuze DHT. The Vuze (Azureus) DHT is based on the Kademlia protocol. Each DHT node is assigned a "random" 160-bit ID based on its IP and port, which determines the index ranges that it stores. To store an (index, value) pair in the DHT, a client looks up 20 nodes with IDs closest to the specified index and then sends store messages to them. Vuze nodes republish the entries in their cache database every 30 minutes to the other 19 nodes close to the value's index in order to combat churn in the DHT. Nodes further remove from their caches all values whose store timestamp is more than eight hours old. This process has a one-hour grace period. The originator node needs to re-push its eight-hour-old (index. value) pairs if it wishes to ensure their persistence past eight hours.

Figure 9:
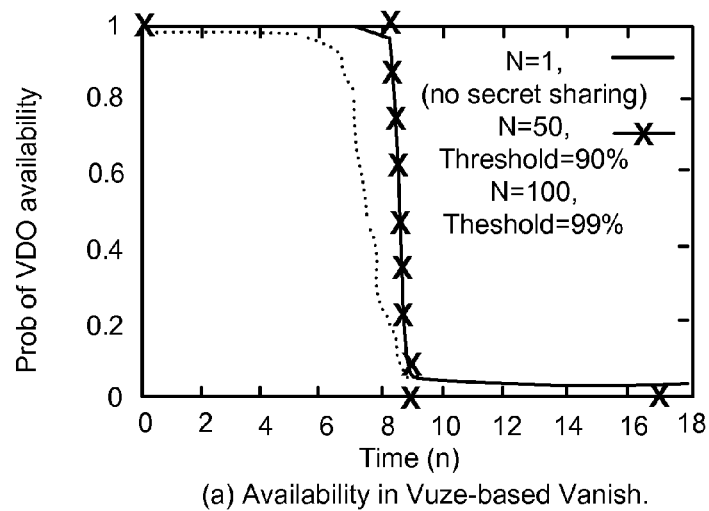
FIG. 9 illustrates performance data of two prototype embodiments.
Figure 9:
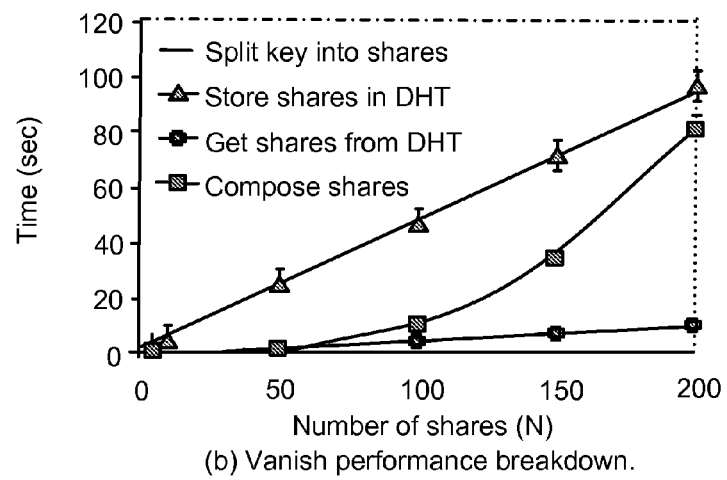

Experiments run with the global Vuze P2P network to evaluate the availability and expiration guarantees it provides. These experiments pushed 1,000 VDO shares to pseudorandom indices in the Vuze DHT and then polled for them periodically. FIG. 9(*a*) shows the average probability that a VDO remains available as a function of the time since creation, for three different N and threshold values. For these experiments, the standard eight-hour Vuze timeout was used.

The N=1 line shows the lifetime for a single share, which by definition does not involve secret sharing. The single-share VDO exhibits two characteristics: non-negligible probabilities for premature destruction ($\approx$1% of the VDOs time out before eight hours) and prolonged availability ($\approx$5% of the VDOs continue to live long after eight hours).

It is noted that in one embodiment secret sharing can address lifetime problems, if present. FIG. 9(*a*) shows that for VDOs with N=50 and threshold of 90%, the probability of premature destruction and prolonged availability both become vanishingly small ($<10^{-3}$). Other values for N$\geq$20 achieve the same effect for thresholds of 90%. However, using very high threshold ratios leads to poor pre-timeout availability curves: e.g., N=100 and a threshold of 99% leads to a VDO availability period of four hours because the loss of only a single share makes the key unrecoverable. Hence, in some embodiments, increasing a threshold value for N can increase security.

The configuration as disclosed can be structured as an application. In one embodiment the application can be a web-browser plug-in. For example, the application may be a FIREFOX web browser plug-in for the GMAIL service and structured for use with sending and reading self destructing emails. It is noted that in a plug-in configuration, no server-side changes are necessary. The plug-in uses Vanish running on each user's machine both to transform an email into a VDO before sending it to GMAIL and similarly for extracting the contents of a VDO on the receiver side.

In one embodiment, the plug-in is implemented as an extension of FireGPG, an existing GPG plug-in for GMAIL, and adds VDO browser overlay controls and functions. Using the plug-in for GMAIL, a user types the body of an email into the GMAIL text box as usual and then selects (e.g., clicks) on a "Create a Vanishing Email" button, which the plug-in overlays atop the Gmail interface. The plug-in encapsulates the user's typed email body into a VDO by issuing a VDO-create request to Vanish, replaces the contents of the GMAIL text box with an encoding of the VDO, and uploads the VDO email to the GMAIL server for delivery. The user can optionally wrap the VDO in GPG for increased protection against malicious services. In the current implementation, each email is encapsulated with its own VDO, though a multi-email wrapping would also be possible (e.g., all emails in the same thread).

When the receiving user selects (e.g., clicks) on one of his emails, the GMAIL browser plug-in inspects whether it is a VDO email, a PGP email, or a regular email. Regular emails need no further action. PGP emails are first decrypted and then inspected to determine whether the underlying message is a VDO email. For VDO emails, the plug-in overlays a link "Decapsulate this email" atop Gmail's regular interface. Selecting (e.g., clicking) this link causes the plug-in to invoke Vanish to attempt to retrieve the clear-text body from the VDO email. If the VDO has not yet timed out, then the plug-in pops up a new window showing the email's clear-text body; otherwise, an error message is displayed.

Likewise, a vanishing file application, called "Vanishing Files," can also be configured using the principles disclosed herein. Vanishing Files can be used directly or by other applications, such as a self-destructing trash bin or Microsoft Word's auto-save. Users can wrap sensitive files into self-destructing VDOs, which expire after a given timeout. In the prototype, the application creates a VDO wrapping one or more files, deletes the clear-text files from disk, and stores the VDO in their place. This produces the effect that, even if an attacker copies the raw bits from the laptop's disks after the timeout, the data within the VDO will be unavailable. Like traditional file encryption, Vanishing Files relies upon existing techniques for securely shredding information stored on disks or memory.

In one embodiment, security of Vanish can correspond to a number of shares and a threshold ratio. FIG. 9(b) shows how the component times scale with the number of shares (N), for a fixed threshold of 90%. It is noted that a cost of splitting keys or getting DHT shares are low—on the order of a few seconds even for a large number of shares. In one embodiment, a cost of storing shares increases linearly with the number of shares, although this can be addressed with pre-push. In one embodiment, parameters of N=50 and a threshold of 90% provide an excellent tradeoff of security and performance. With these parameters and the simple pre-push optimization, user-visible latency for Vanish operations, such as creating or reading a Vanish email, is extremely low just a few seconds for a 1 KB email, as shown in FIG. 9(c).

For convenience, the Vanishing Emails plug-in can be modified to allow users to include less sensitive clear-text along with a self-destructing encrypted text block in the email. This facilitates identifying information over and above the subject line. Certain types of communication may need timeouts longer than eight hours. Hence, Vanish can be configured for use in a proxy setting, where a Vanish server runs on behalf of a user at an online location (e.g., the user's home) and refreshes VDO shares as needed to achieve each VDO's intended timeout in eight-hour units. The user can then freely execute the Vanish plug-in from any connection-intermittent location (e.g., a laptop).

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, in FIGS. 4, 5, and 7. As previously noted, modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of an embodiment. This description should be read to include one or at least one and the singular also includes the plural unless it is obvious that it is meant otherwise.

Upon reading this disclosure, those of skill in the art will appreciate still additional alternative structural and functional designs for a system and a process for encapsulating data into a vanishing data object and decrypting the vanishing object to recover the data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for encapsulating data, the method comprising:
   receiving data to encapsulate;
   generating a random encryption key;

encrypting the data with the generated encryption key thereby generating encrypted data;

generating a data key corresponding to a decryption key;

splitting the generated data key at one or more levels in a hierarchical computing configuration, into a predetermined number, N, of shares of the data key wherein a predetermined threshold number, M, of shares of the data key is required to reconstruct the data key, where M is less than or equal to N, and each share at each level divisible one or more times into additional shares at the next level;

identifying one or more locations within one or more network configurations to store each share of the data key;

storing each share of the data key at the selected location wherein each location is configured to delete the stored share of the data key after a specified period of time; and constructing a vanishing data object that comprises the encrypted data and information sufficient to retrieve a threshold number of data key shares.

2. The method of claim 1, wherein the generated data key is split into a predetermined number of shares using threshold secret sharing, the threshold secret sharing to determine how many of the predetermine number, N, of shares are needed to reconstruct the data key.

3. The method of claim 1, wherein a random access key is generated and used to identify one or more locations within one or more network configuration to store each share of the data key.

4. The method of claim 1, wherein a hash table based indexing method is used to store one or more share of the data key in one or more locations within a distributed network architecture.

5. The method of claim 1, wherein the location is configured to delete the stored data after a specified period of time, the period of time based on either a clock in the location or instructions contained in the metadata of the received shares of the generated data key.

6. A non-transitory computer readable medium configured to store instructions, the instructions when executed by a processor cause the processor to:

receive data to encapsulate;

generate a random encryption key;

encrypt the data with the generated encryption key thereby generating encrypted data;

generate a data key corresponding to a decryption key;

split the generated data key into a predetermined number, N, of shares of the data key wherein a predetermined threshold number, M, of shares of the data key is required to reconstruct the data key, where M is less than or equal to N, each share split at one or more levels in a hierarchical computing configuration, and each share at each level divisible one or more times into additional shares at the next level;

identify one or more locations within one or more network configurations to store each share of the data key;

store each share of the data key at the selected location wherein each location is configured to delete the stored share of the data key after a specified period of time; and construct a vanishing data object that comprises the encrypted data and information sufficient to retrieve a threshold number of data key shares.

7. The computer readable medium of claim 6, wherein the generated data key is split into a predetermined number of shares using threshold secret sharing, the threshold secret sharing to determine how many of the predetermine number, N, of shares are needed to reconstruct the data key.

8. The computer readable medium of claim 6, wherein a random access key is generated and used to identify one or more locations within one or more network configuration to store each share of the data key.

9. The computer readable medium of claim 6, wherein a hash table based indexing method is used to store one or more share of the data key in one or more locations within a distributed network architecture.

10. The computer readable medium of claim 6, wherein the location is configured to delete the stored data after a specified period of time, the period of time based on either a clock in the location or instructions contained in the metadata of the received shares of the generated data key.

11. A method for decapsulating encrypted data, the method comprising:

determining a vanishing data object for the encrypted data to decapsulate, the vanishing data object comprising an address information of a data key share needed to decrypt the encrypted data;

extracting the address information of the data key share from the vanishing data object;

retrieving the data key shares based on the extracted address information;

determining whether the number of key shares retrieved is greater than or equal to a threshold number, M, wherein if the number of key shares retrieved is less than the threshold number, M, the data key is unrecoverable;

reconstructing the data key if the number of retrieved data key shares is at least equal to the threshold number, M of key shares, the reconstructing the date key further comprising reconstructing the shares of data key at each level, each data key share split at one or more levels in a hierarchical computing configuration, each data key share at each location divisible into additional shares at the next level one or more times; and decrypting the encrypted data.

12. The method of claim 11, wherein the method of retrieving the data key shares comprises of extracting an access key from the vanishing data object and using the access key to identify the locations of the data key shares and retrieving data key shares from the identified locations.

13. The method of claim 11, wherein the number of data key shares retrieved is limited to the number of shares required to reach the threshold number, M.

14. The method of claim 11, wherein if the retrieved shares of the data key are less than the threshold number, M, then the data key cannot be reconstructed and the encrypted data cannot be decrypted by using the vanishing data object.

15. A non-transitory computer readable medium configured to store instructions for decapsulating encrypted data, the instructions when executed by a processor cause the processor to:

determine a vanishing data object for the encrypted data to decapsulate, the vanishing data object comprising an address information of a data key share to decrypt the encrypted data;

extract the address information of the data key share from the vanishing data object;

retrieve the data key shares based on the extracted address information;

determine whether the number of key shares retrieved is greater than or equal to a threshold number, M, wherein if the number of key shares retrieved is less than the threshold number, M, the data key is unrecoverable;

reconstruct the data key if the number of retrieved data key shares is at least equal to the threshold number, M of key shares, the reconstructing the data key further comprising reconstructing the shares of data key at each level, each data key share split at one or more levels in a hierarchical computing configuration, each share at each location divisible into additional shares at the next level one or more times; and decrypt the encrypted data.

16. The computer readable medium of claim 15, wherein the processor retrieves the data key shares by extracting an access key from the vanishing data object and using the access key to identify the locations of the data key shares and retrieving data key shares from the identified locations.

17. The computer readable medium of claim 15, wherein the number of data key shares retrieved is limited to the number of shares required to reach the threshold number, M.

18. The computer readable medium of claim 15, wherein if the retrieved shares of the data key are less than the threshold number, M, then the data key cannot be reconstructed and the encrypted data cannot be decrypted by using the vanishing data object.

\* \* \* \* \*

UNITED STATES PATENT AND TRADEMARK OFFICE
CERTIFICATE OF CORRECTION

| | | |
|---|---|---|
| PATENT NO. | : 8,520,855 B1 | Page 1 of 1 |
| APPLICATION NO. | : 12/718885 | |
| DATED | : August 27, 2013 | |
| INVENTOR(S) | : Tadayoshiu Kohno, Roxana Geambasu and Henry M. Levy | |

It is certified that error appears in the above-identified patent and that said Letters Patent is hereby corrected as shown below:

On the Title Page
Page 2, Item (56) References Cited, OTHER PUBLICATIONS
    Douceur, J.R., "The Sybil Attack," Proc. of IPTOPS, 2002 should read
    Douceur, J.R., "The Sybil Attack," Proc. of IPTPS, 2002.

In the Claims
Column 19, line 66, delete "predetermine" and insert --predetermined--.
Column 20, line 30, delete "date" and insert --data--.
Column 20, line 38, after "comprises," delete "of".

Signed and Sealed this
Eleventh Day of November, 2014

Michelle K. Lee
*Deputy Director of the United States Patent and Trademark Office*